Figure 1:
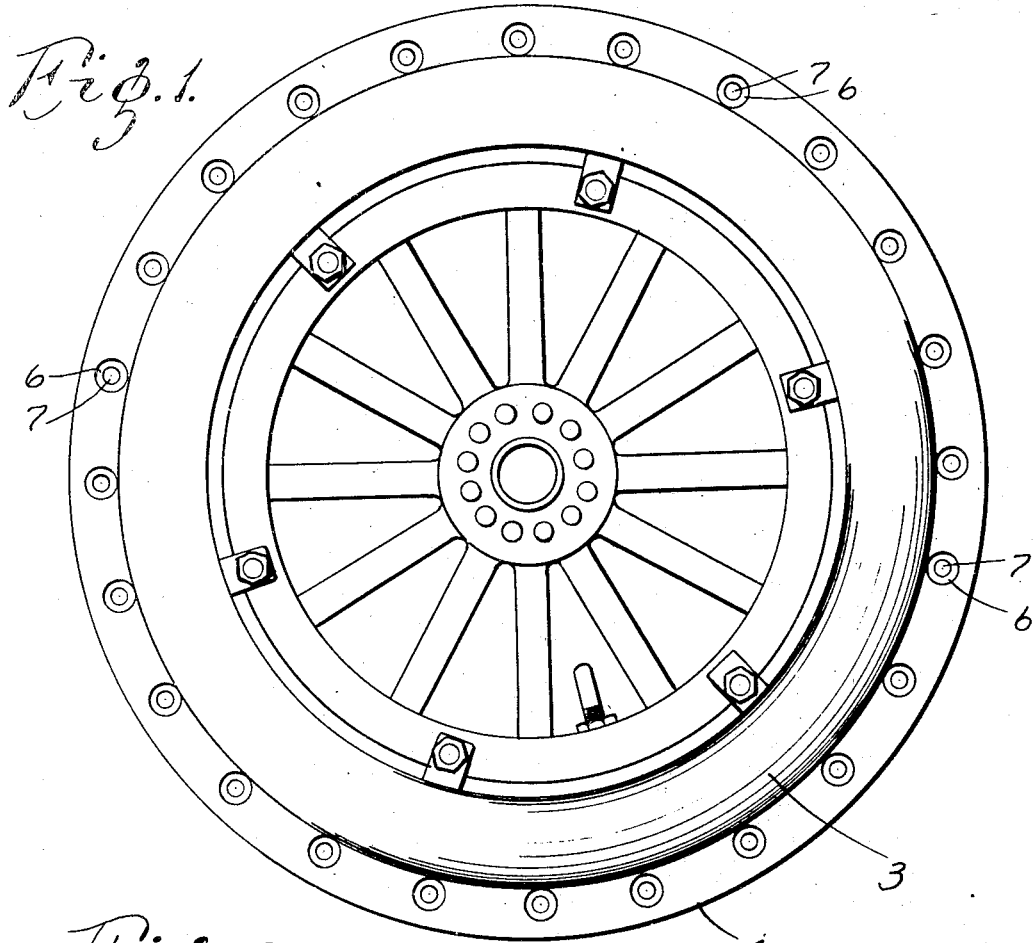

July 7, 1931. C. PARIDY 1,813,758
PNEUMATIC TIRE
Filed July 3, 1929

INVENTOR:
CHARLES PARIDY
BY Edward E. Longan
ATTORNEY.

Patented July 7, 1931

1,813,758

UNITED STATES PATENT OFFICE

CHARLES PARIDY, OF BELLEVILLE, ILLINOIS

PNEUMATIC TIRE

Application filed July 3, 1929. Serial No. 375,637.

My invention relates to improvements in pneumatic tires, and has for its primary object the construction of a casing for pneumatic tires which is provided with a relatively heavy tread extending completely around the casing whereby the danger of puncturing the casing and tube to be contained therein by tacks and other small nails, such as are commonly found on roadways, is reduced to a minimum.

A further object is to construct a pneumatic tire in which the casing is provided with a heavy upstanding tread, the tread having spaced apart transverse openings therein, the openings being so shaped as to be self cleaning so that dirt and mud will not be retained therein as this would destroy the resiliency of the tread.

Figure 2:
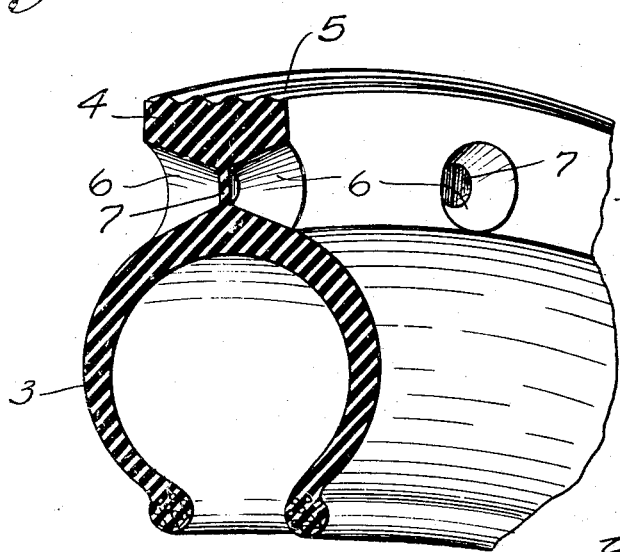

In the drawings:

Fig. 1 is a side elevation of a vehicle wheel with my improved tire in position; and Fig. 2 is an enlarged fragmental perspective section of the casing.

In the construction of my device I employ a casing 3, this being preferably in the form of an endless tube, which is open at its bottom, so that an air tube can be inserted therein.

Extending around the periphery of the casing 3 is a flange or tread 4. This tread is formed as an integral part of the casing and is of vulcanized rubber. The casing 3 is built in a manner well known to the pneumatic tire trade and, therefore, needs no particular description.

The periphery of the extension or tread 4 is preferably roughened as illustrated by the numeral 5 so that it will have a greater gripping effect on the road surface. I do not, however, desire to limit myself to any precise form of roughening as this may be made of any desired design.

In the side walls of the tread member 4 are formed openings 6. These openings extend transversely of the tread and are substantially frusto-conical, leaving a relatively thin web of rubber 7 between the openings on opposite sides of the tread. By this construction it will be noted that the tread is made more resilient. The openings can be placed as close together as desired; it following that the more openings in the tread, the more resilient the tread will be.

My purpose in making the openings taper or frusto-conical is that in the event dirt accumulates in these openings as when riding over a muddy road, the openings will constantly be flattened as that portion of the tread contacts with the road surface. This will naturally compress the mud which has gathered in the openings, and upon that portion of the tread leaving the road surface and due to the conical shape of the openings, the dirt will readily pass out of these openings.

This is also enhanced by the centrifugal action of the rotating tire because the tendency will be to throw the dirt toward the outside or periphery of the tread and this dirt coming in contact with the upwardly and outwardly inclined wall of the opening will have a tendency to slide along this wall and be thrown out from the tire. If it were not for this fact, there would be danger of the mud remaining in the openings and become densely packed therein and in a short time destroy all resiliency which has been imparted to the tread by reason of the openings, but with my improved method of forming the openings conical with the large end of the opening at the outside walls of the tread, such retention of mud and other foreign matter in the openings is prevented.

It will also be noted that the web 7 is relatively thin so that it can vibrate or move, that is bulge from one side to the other. This vibration or bulging of the web as it passes under the load point will have a tendency to start or push out any dirt or foreign matter which lodges against the web or the base of the openings 6 thereby assisting the cleaning of these openings and keeping them free from accumulations of foreign matter.

Having fully described my invention, what I claim is:

1. A tire comprising a pneumatic casing portion and an integral tread portion of relatively greater diameter and relatively narrow width, said tread portion having relatively thin circumferentially spaced diaphragms at the medial portion of the tread formed by alined frusto-conical shaped recesses extending inwardly from the opposite sides of the tread, said recesses being substantially tangential to the casing portion thereat.

2. A tire comprising a casing substantially circular in cross section and provided with an integral tread portion of relatively narrow width and greater diameter than said casing, said tread portion having alined circumferentially spaced frusto-conical shaped recesses at the sides thereof and tangential to said casing forming relatively thin diaphragms at the medial portion of the tread.

In testimony whereof I have affixed my signature.

CHARLES PARIDY.